UNITED STATES PATENT OFFICE.

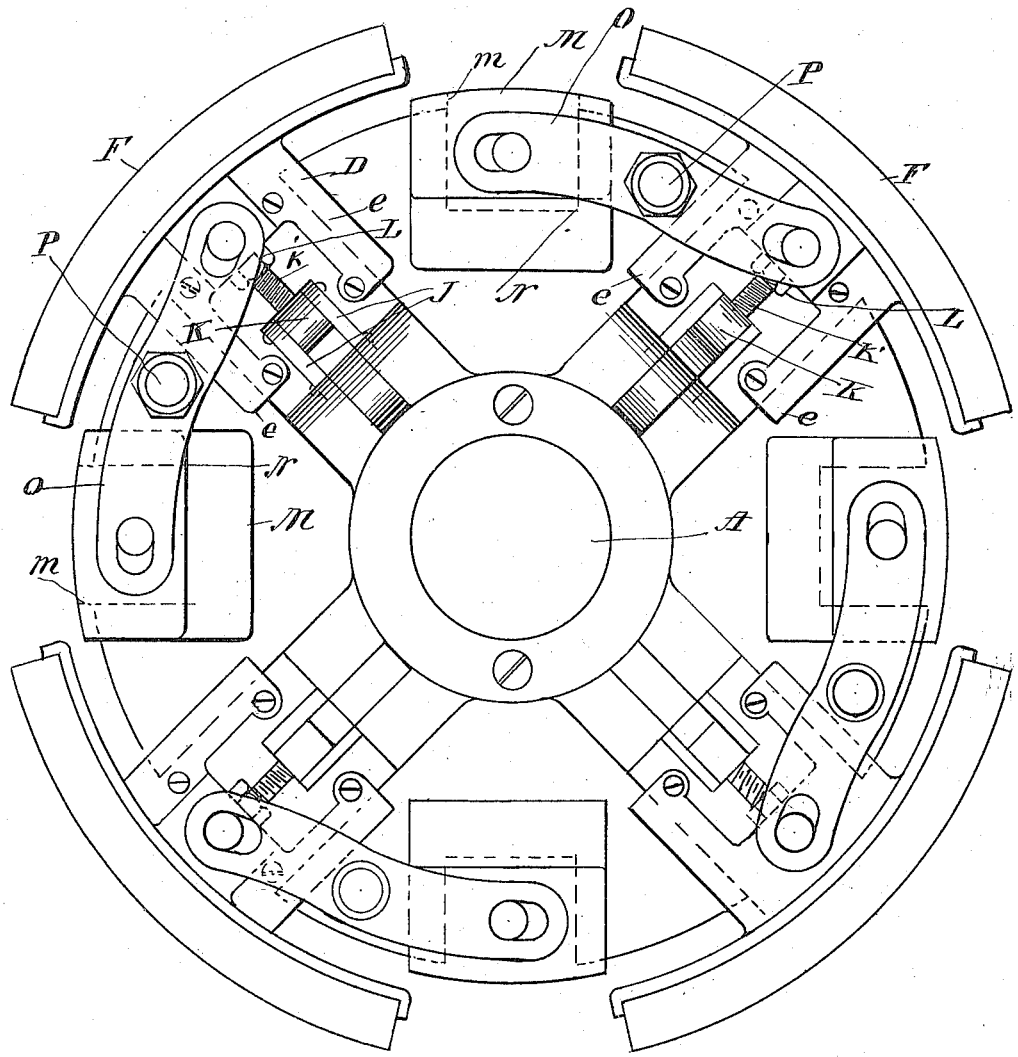

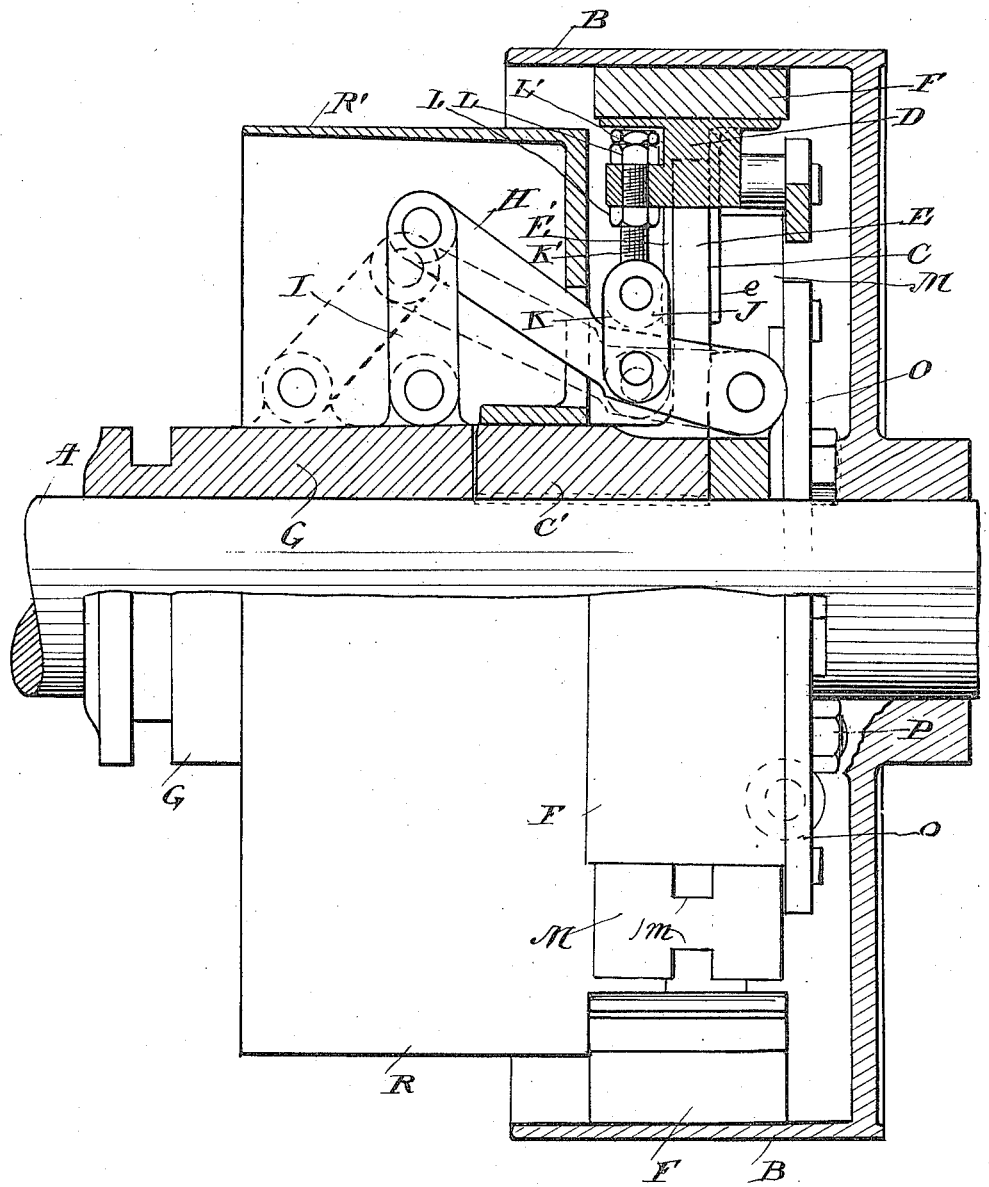

JAMES SWANDA, OF CLEVELAND, OHIO.

FRICTION-CLUTCH.

1,161,423.  Specification of Letters Patent.  Patented Nov. 23, 1915.

Application filed December 21, 1914. Serial No. 878,429.

*To all whom it may concern:*

Be it known that I, JAMES SWANDA, a citizen of the United States, and resident of Cleveland, in the county of Cuyahoga and State of Ohio, have invented certain new and useful Improvements in Friction-Clutches, of which I hereby declare the following to be a full, clear, and exact description, such as will enable others skilled in the art to which it appertains to make and use the same.

The invention relates to a simple, practical and efficient form of friction clutch, in which engaging shoes are radially movable within a suitable disk and can be operated to engage the flange of an outer or driven member. In this device means are employed for preventing irregular movement of the shoes after they are withdrawn from contact with the outer rim or flange of the driven member, the same means preventing the shoes from being influenced by centrifugal force to fly out and engage the driven member when it is desired to have them inoperative.

The invention also includes a protective device for the working parts of the clutch and further consists in the combination and arrangement of parts and construction of details hereinafter described, shown in the accompanying drawings and specifically pointed out in the claims.

In the accompanying drawings Figure 1 is a face view of the clutch; Fig. 2 is a longitudinal section thereof on the center line of one of the radially movable shoes.

In these views A is the shaft upon which the clutch is mounted B the flange of the driven member, C C is a disk upon which shoes D, D, are radially movable in open slots E, E, therein. The shoes are retained in place by means of removable plates $e$, $e$, and flanges E', E', which form guides for the shoes.

F, F, are the wooden faces for the shoes. The shoes are operated by means of the clutch sleeve G which slides freely upon the shaft to which the disk is fixedly attached. Levers H, H, pivoted in the hub C' of the disk C are operatively connected with the sliding clutch sleeve G by means of the links I, I, in such a manner that when the sleeve is advanced the levers will all move outwardly and when the sleeve is retired the levers will move inwardly. To each lever a link J is pivoted at one end, the other extremity of which is pivoted to a screw eye K, the screw K' of which is adjustably secured in the shoe D, preferably by means of nuts L and lock nut L'. In this manner the movement of each lever is communicated to its respective shoe, and the position of the attachment of each link I, I is such that the amount of movement of each shoe is relatively small to that of the sleeve by which means also the power is increased.

Since the shoes D are formed of metal and further are weighted by means of their wooden faces F, F, their combined weight when influenced by the centrifugal force would be enough to throw them out against the driven member if their weight were not balanced by some other agency.

In order to provide the required weight to balance the weights of the several shoes, and to so dispose them that the weights and their connecting parts will not project or interfere with the action of the other working parts, the peculiar construction illustrated in the drawing is employed. Here M, M, are weights which are slidingly movable in radial slots N, N, intermediate of the positions of the shoes. The weights are channeled at $m$, $m$, on their edges to provide suitable guides therefor. Rock arms O, O, are pivoted in the disk at P, P, intermediate of the positions of the weights and jaws, and at its extremities each arm is pivoted to one weight and shoe, and moves in a plane parallel to the face of the disk. The effect of this action is to balance the weight of each shoe and connecting parts, since the tendency of each shoe to throw outward under the influence of centrifugal force will be counteracted by the tendency of each weight to do the same under the same influence. The manner of construction will also preserve a compact outer face to the clutch without projecting parts so that the driven member can be brought much closer to the disk and there will be no protruding members upon which a belt or clothing can catch. It will be seen that all the weights and shoes extend beyond the circumference of said disk and the shoes include the larger portion of the periphery allowing sufficient room for the weights to pass between them. This structure allows a clearance in all directions and prevents dirt or obstructions from collecting to prevent the action of the weights.

To further protect the working parts of the clutch from a slipping belt, a guard R having a broad flange is sleeved over the hub of the clutch, as shown in Fig. 2.

Having described the invention what I claim as new and desire to secure by Letters Patent is:

1. In a friction clutch, in combination with a disk, provided with spaced radial guides, friction shoes radially movable in said disk, in some of said guides, and separated at their ends, operating mechanism therefor, weights corresponding to said friction shoes and radially movable in alternate guides, intermediate of said shoes in said disk, and rock arms pivoted on said disk and connecting alternate weights and shoes, said weights and shoes normally extending beyond the periphery of said disk.

2. In a friction clutch, a disk having open slots in its periphery, a series of shoes radially movable in said disk and separated at their adjoining ends, and a corresponding number of weights radially movable in said open slots, at points intermediate of the opposed ends of said shoes, and having channeled edges engaging the sides of said slots, rock arms pivoted in said disk, each rock arm connecting one of said shoes with one of said weights, said rock arms pivoted at points intermediate of said weights and shoes.

3. In a friction clutch, in combination, a disk having a hub having alternate long and short radial openings therein, brake shoes slidable in the longer openings, operating mechanism therefor including a clutch sleeve, levers passing through said longer slots and pivoted in the hub of said disk, a link connecting said sleeve and the opposite ends of said levers, a screw eye adjustable in each shoe, and a short link connecting each screw eye with one of said levers near its inner end and a weight movable in each short slot in said disk, and a rock arm pivoted in said disk and connecting each weight with its corresponding shoe.

4. In combination, a friction clutch, a disk provided with radial guide slots and having a hub, brake shoes slidable in alternate guide slots in said disk, corresponding weights slidable in intermediate openings, and operating mechanism therefor comprising a longitudinally movable clutch sleeve, levers pivoted in said hub and passing through the said disk, and links connecting the opposite ends of said levers with said sleeve, and links intermediate of the ends of said levers, operatively and adjustably connecting said levers with said brake shoes, and a slotted rock arm operatively connecting each weight with its corresponding shoe, each rock arm pivoted in said disk.

In testimony whereof, I hereunto set my hand this 12 day of December 1914.

JAMES SWANDA.

In presence of—
 Wm. M. Monroe,
 R. W. Jeremiah.

Copies of this patent may be obtained for five cents each, by addressing the "Commissioner of Patents, Washington, D. C."